United States Patent
Rai et al.

(10) Patent No.: US 11,658,574 B2
(45) Date of Patent: May 23, 2023

(54) PROGRAMMABLE SOFT START OF BUCK-BOOST CONVERTER

(71) Applicant: Cypress Semiconductor Corporation, San Jose, CA (US)

(72) Inventors: Hariom Rai, Bangalore (IN); Pulkit Shah, Bangalore (IN); Arun Khamesra, Bangalore (IN); Rajesh Karri, Visakhapatnam (IN); Praveen Suresh, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 11 days.

(21) Appl. No.: 17/313,854

(22) Filed: May 6, 2021

(65) Prior Publication Data

US 2022/0069709 A1 Mar. 3, 2022

Related U.S. Application Data

(60) Provisional application No. 63/073,858, filed on Sep. 2, 2020.

(51) Int. Cl.
*H02M 3/158* (2006.01)
*H02M 1/36* (2007.01)
*H02M 1/00* (2006.01)

(52) U.S. Cl.
CPC ........... *H02M 3/1582* (2013.01); *H02M 1/36* (2013.01); *H02M 1/0003* (2021.05)

(58) Field of Classification Search
CPC ........ G06F 1/23; G06F 1/266; G06F 13/4282; G06F 2213/0042; H02M 1/36; H02M 3/158; H02M 3/1582
See application file for complete search history.

(56) References Cited

U.S. PATENT DOCUMENTS

| | | | | |
|---|---|---|---|---|
| 5,630,090 A | * | 5/1997 | Keehn | G06F 1/30 713/323 |
| 10,019,021 B1 | * | 7/2018 | Lee | H02M 3/158 |
| 10,651,722 B2 | * | 5/2020 | Yang | H02M 3/1582 |
| 2006/0035115 A1 | * | 2/2006 | Norimatsu | H01M 8/04604 429/432 |
| 2007/0114984 A1 | * | 5/2007 | Li | H02M 3/157 323/283 |
| 2015/0054479 A1 | * | 2/2015 | Shiwaya | H02M 3/1582 323/271 |
| 2015/0279207 A1 | * | 10/2015 | Breuer | H05B 45/12 340/12.5 |

(Continued)

*Primary Examiner* — Gustavo A Rosario-Benitez

(57) ABSTRACT

An IC controller for a USB Type-C device includes a register that is programmable to store a pulse width and a frequency. A buck-boost converter of the controller includes a first high-side switch and a second high-side switch. Control logic is coupled to the register and gates of the first/second high-side switches. To perform a soft start in one of buck mode or boost mode, the control logic: causes the second high-side switch to operate in diode mode; retrieves values of the pulse width and the frequency from the register; causes the first high-side switch to turn on using pulses having the pulse width and at the frequency; detects an output voltage at the output terminal of the buck-boost converter that exceeds a threshold value; and in response to the detection, transfers control of the buck-boost converter to an error amplifier loop coupled to the control logic.

20 Claims, 7 Drawing Sheets

(56) References Cited

U.S. PATENT DOCUMENTS

| | | | |
|---|---|---|---|
| 2018/0026637 A1* | 1/2018 | Crotty | H03K 19/017581 326/39 |
| 2019/0064914 A1* | 2/2019 | Krishnakumar | G06F 1/3234 |
| 2019/0214911 A1* | 7/2019 | Hashiguchi | H02M 3/155 |
| 2019/0258832 A1* | 8/2019 | Jung | H02M 3/1582 |
| 2019/0356215 A1* | 11/2019 | Lin | G05F 1/468 |
| 2021/0303049 A1* | 9/2021 | Jyani | G06F 1/266 |
| 2021/0320590 A1* | 10/2021 | Ng | H02M 1/088 |

\* cited by examiner

PROGRAMMABLE SOFT START OF BUCK-BOOST CONVERTER

RELATED APPLICATIONS

This application claims the benefit of U.S. Provisional Patent Application No. 63/073,858, filed on Sep. 2, 2020, the entire contents of which is incorporated herein by this reference.

TECHNICAL FIELD

This disclosure relates to integrated circuits (ICs) that control Universal Serial Bus (USB) power delivery to electronic devices.

BACKGROUND

Various electronic devices (e.g., such as smartphones, tablets, notebook computers, laptop computers, chargers, adapters, power banks, etc.) are configured to transfer power through USB connectors according to USB power delivery protocols defined in various versions and revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. In various applications, electronic manufacturers may also use power converters (e.g., such as buck-boost converters) that need to meet various USB-PD specification requirements such as, for example, requirements for output voltage (Vout) monotonicity and stability.

DETAILED DESCRIPTION

Figure 1:
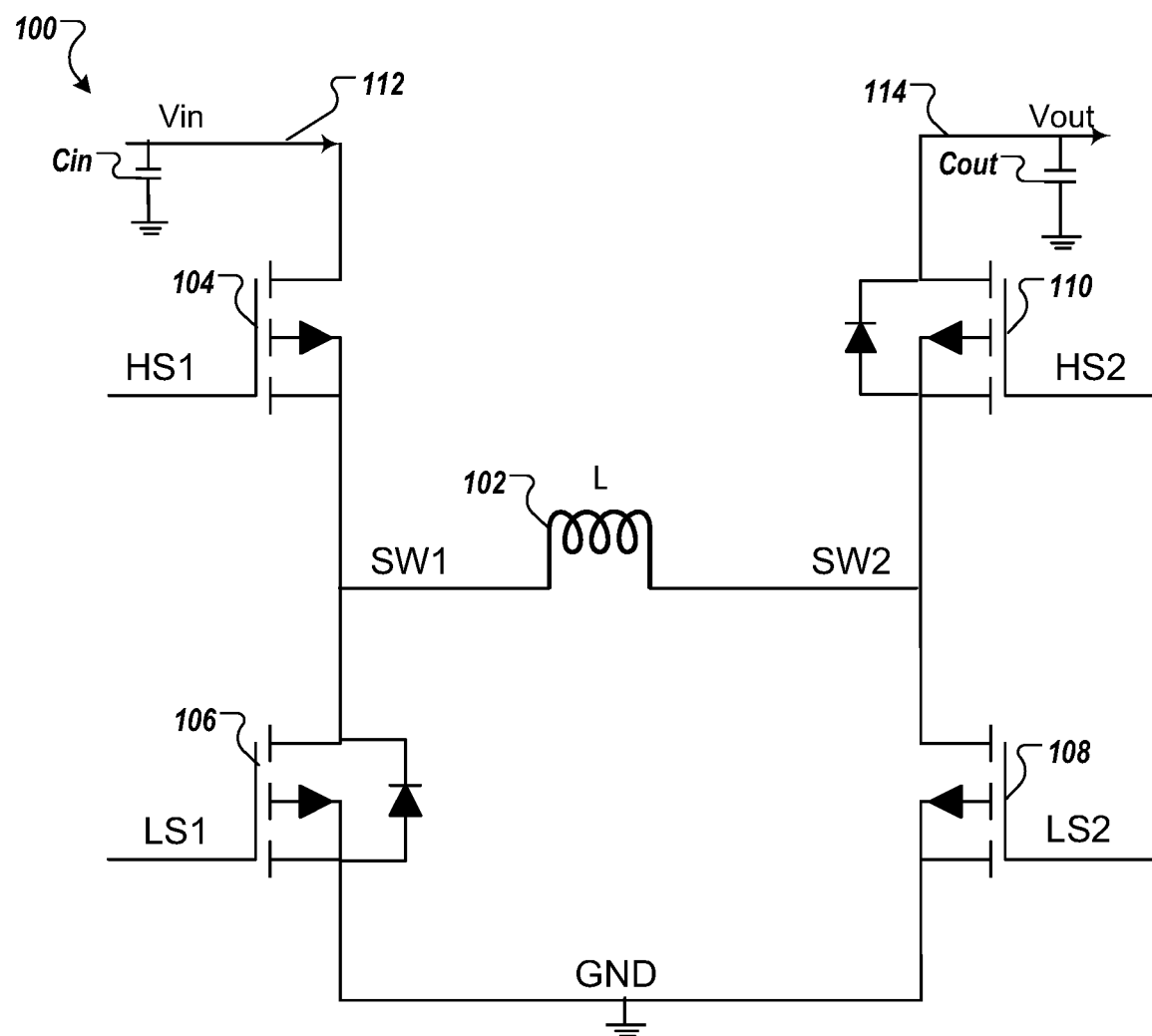
FIG. 1 is a schematic diagram of a buck-boost converter in at least one embodiment.

The following description sets forth numerous specific details such as examples of specific systems, components, methods, and so forth, in order to provide a good understanding of various embodiments of the mode-transition architecture for USB Type-C controllers described herein. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of a mode-transition architecture in USB Type-C controllers that can be disposed to operate in various electronic devices. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., cables, hubs, docking stations, adapters, chargers, etc.), audio/video/data recording and/or playback devices (e.g., cameras, voice recorders, hand-held scanners, monitors, etc.), and other similar electronic devices that can use USB interfaces for communication, battery charging, and/or power delivery.

As used herein, "USB-enabled" device or system refers to a device or system that includes, is configured with, or is otherwise associated with a USB connector interface. A USB-enabled electronic device may comply with at least one release of a Universal Serial Bus (USB) specification. Examples of such USB specifications include, without limitation, the USB Specification Revision 2.0, the USB 3.0 Specification, the USB 3.1 Specification, the USB 3.2 Specification and/or various supplements, versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C (also referred to herein as "USB-C"), is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (or communication channel, denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc. As used herein, "USB-PD subsystem" refers to one or more logic blocks and other analog/digital hardware circuitry, which may be controllable by firmware in an IC controller and which is configured and operable to perform the functions and to satisfy the requirements specified in at least one release of the USB-PD specification. The IC controller can be implemented in a USB Type-C device. The IC controller can be implemented in a USB device.

Power delivery in accordance with the USB-PD specification(s) can be embodied in several different types of USB Type-C applications. Examples of such types of Type-C applications include, but may not be limited to: a downstream facing port (DFP) application, in which an IC controller with a USB-PD subsystem is configured to provide a downstream-facing USB port (e.g., in a USB-enabled host device); an upstream facing port (UFP) application, in which an IC controller with a USB-PD subsystem is configured to provide an upstream-facing USB port (e.g., in a USB-enabled peripheral device or adapter); a dual role port (DRP) USB application, in which an IC controller with a USB-PD subsystem is configured to support both DFP and UFP applications on the same USB port (e.g., a USB Type-C port that is configured to operate as either a power provider or a power consumer or can alternate between these two roles dynamically by using USB-PD power role swap); and an active cable application, in which an IC controller with a USB-PD subsystem is disposed into, and configured to operate, an electronically marked cable assembly (EMCA) Type-C cable.

A USB-C/PD power supply can be used to deliver power with a wide output voltage range of 3.3V-21.5V, a wide current range of 1 A-5 A, and a wide input supply voltage range of 5.0V to 24V, as per USB-C/PD protocol. Due to this wide voltage/current range for USB-C power delivery and rapid switching requirements between input and output voltage signals, a buck-boost (BB) converter can be employed within a USB Type-C controller, which can be controlled to provide power to expected output loads.

FIG. 1 is a schematic diagram of a BB converter 100 in at least one embodiment. The BB converter 100 includes an inductor 102, a first high-side switch 104 (or HS1), a second high-side switch 110 (or HS2), a first low-side switch 106 (or LS1), and a second low-side switch 108 (or LS2). In one embodiment, these switches are n-type field effect transistors (NFETs), as illustrated. In another embodiment, although not illustrated, the high side switches are p-type field effect transistors (PFETs). In various embodiments, the first high-side switch 104 is coupled between an input terminal 112 and a first side of the inductor 102 of the buck-boost converter 100. The high-side switch 110 is coupled between a second side of the inductor 102 and an output terminal 114. The first low-side switch 106 is coupled between the first side of the inductor 102 and a ground of the buck-boost converter 100. The second low-side switch 108 is coupled between the second side of the inductor and the ground. The input terminal 112 can carry an input voltage (Vin) and the output terminal can carry an output voltage (Vout) of the BB converter 100. The BB converter 100 can further include an input capacitor (Cin) coupled to the input terminal 112 and an output capacitor (Cout) coupled to the output terminal 114.

In various embodiments, the switches (HS1, HS2, LS1, LS2) can be controlled to operate the buck-boost converter 100 in one of four modes, including a buck mode, a BB buck mode, a BB boost mode, and a boost mode. Of these modes, performing a soft start of the BB converter 100 may only need to determine whether the buck-boost converter 100 is in buck mode or boost mode. For example, if the input voltage (Vin) is higher than the output voltage (Vout), the buck-boost converter 100 is in buck mode. In the buck mode, control logic can send pulses modulated to have a certain pulse width (PW) to intermittently turn on the first high-side switch 104, which builds current through the inductor 102 and ultimately builds the output voltage, Vout. Further, if Vout is higher than Vin, the buck-boost converter is in boost mode. In boost mode, the control logic can provide PW-modulated (PWM) signals to the second low-side switch 108. The frequency of the PWM signals can also be varied. Generally, with a high duty cycle of the PWM signals and the higher the frequency, the faster the energy will build in the inductor and the faster the voltage output (Vout) will build as well.

For such a BB converter 100, the input capacitor (Cin), output capacitor (Cout), and the inductor 102 can be designed based on input, output, and load current requirements. In various embodiments, the design of the BB converter 100 (or a larger system or device that includes the BB converter 100) seeks to limit the maximum current to a certain amperage and wattage requirement. Once total output power range is known, one can determine input current requirements. From input current requirements, one can determine values for capacitance of the input and output capacitors (Cin and Cout) and for the inductance of the inductor 102.

In various embodiments, in order to start up a USB device, which includes the BB converter 100, with such a wide range of possible current and voltage inputs and outputs, a soft start should provide sufficient control in ramping up (or building) the output voltage to a target (or expected) operating output voltage for a USB device. Such a soft start, in addition, is expected to meet certain conditions for an efficient and safe start-up of the USB device. For example, the soft start should ensure the inductor 102 does not saturate, as once saturated, the inductor 102 loses properties as an inductor. Further, the soft start should control input in-rush current, e.g., prevent a sudden jump in current into the input terminal 112. The soft start should further ensure both that the output voltage (Vout) does not overshoot a target voltage by too much and that the BB converter 100 does not take too long to startup, which requirements may need to be balanced against each other.

In certain BB converter-based systems or devices, an additional soft-start pin is used to define soft start time using an external capacitor. A set current is sourced from a chip on which the BB converter 100 is located through this external capacitor in order to get a ramping voltage for a reference voltage used on an error amplifier ("EA"), which is integrated within a control loop based on the output voltage of the reference voltage. Thus, this EA is designed to regulate the output voltage, and slowly ramping of the reference voltage can provide the desired soft start. By way of disadvantage, this method requires an additional pin on a chip to control startup (so the functionality of one pin is lost) and an additional capacitor is required at the board level. This capacitor that provides the ramping voltage for startup may need to be at least ten times larger than a compensation capacitor of the EA, significantly increasing the area and cost of the design. Further, this design exerts no control on an in-rush current profile. Also, the startup using such a large external capacitor cannot be made faster than the bandwidth of the BB converter system, which is then designed for the worst-case condition across the input and output voltages and the load range.

In various embodiments, which will be discussed in detail, these and other deficiencies in the current art are overcome by employing an efficient and programmable soft start solution that can be directed by firmware of an integrated circuit (IC) controller that includes the BB converter 100. Some minor additional hardware, such as a set of multiplexers can be added in order to perform the soft start and control transitions between the soft start and normal control by an EA control loop. The added hardware is minimal in comparison to the additional pin and large external capacitor that would otherwise be required.

In some embodiments, an IC controller for a Universal Serial Bus (USB) Type-C device can include a register that is programmable to store a pulse width and a frequency. The register can be just use of local volatile memory or other hardware register in which to store values for the pulse width and frequency at which to perform the soft start. The IC controller can further include control logic operatively coupled to the register and gates of the first high-side switch 104 and the second high-side switch 110. To perform a soft start in a buck mode, as one example, the control logic can retrieve values of the pulse width and the frequency from the register and cause the first high-side switch 104 to turn on using pulses having the pulse width and at the frequency. The control logic can further be adapted to cause the second high-side switch 110 to operate in diode mode, e.g., to be turned off such that the switch provides a parasitic diode between source and drain of the switch that can still conduct current. This pulse width and frequency can, for example, differ from varying pulse widths and frequency at which the BB converter 100 are operated during EA-control mode. The control logic can further detect an output voltage at the output terminal of the buck-boost converter that meets (or exceeds) a threshold value and, in response to the detection, transfer control of the buck-boost converter to an error amplifier (EA) loop coupled to the control logic. The case for the boost mode will also be described.

Therefore, advantages of the systems and methods implemented in accordance with some embodiments of the present disclosure include, but are not limited to, the flexibility of employing programmable pulse-width and frequency values to control ramp-rate of the output voltage (Vout). Further, firmware can dynamically change the values for the pulse-width and/or frequency during operation based on Vout and can control the in-rush current profile. Additionally, the disclosed design does not depend on the EA control loop bandwidth and thus can be made faster than the bandwidth of the BB converter system or device. Furthermore, there is no need of additional pin and external capacitor. Once board is manufactured, there is no need to change any external component to alter soft-start. For example, a firmware update would be sufficient to reprogram the register with different values for the pulse width and frequency of the soft start. Other advantages will be apparent to those skilled in the art, as explained throughout the following description of the various figures.

Figure 2A:
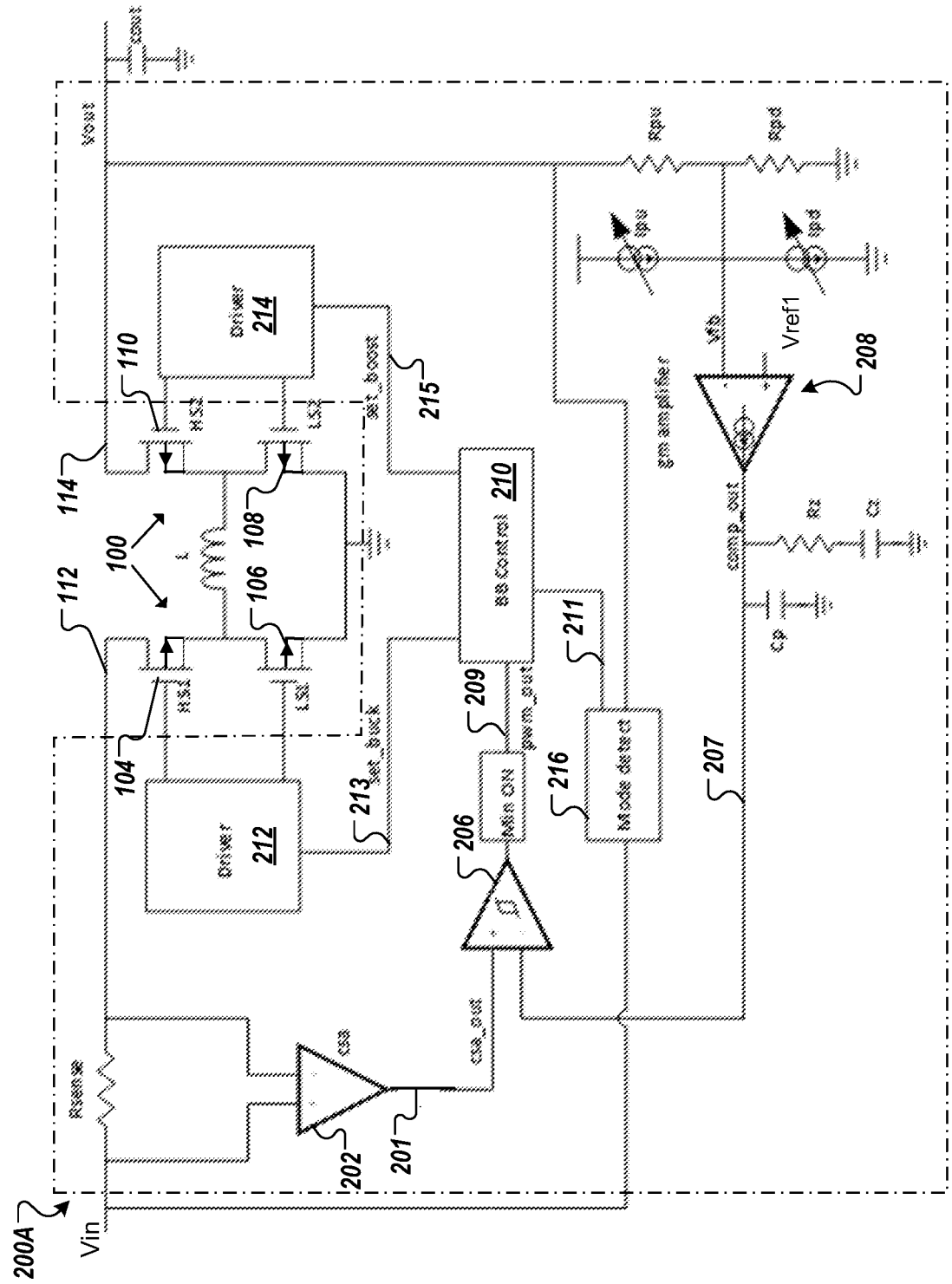
FIG. 2A is a block diagram of a USB controller that includes a buck-boost converter in at least one embodiment.

FIG. 2A is a block diagram of a USB controller 200A that includes, or is coupled to, the buck-boost converter 100 in at least one embodiment. The USB controller 200A includes a current sense amplifier (CSA) 202, a comparator 206, an error amplifier (EA) 208, BB control logic 210, a driver 212, a driver 214, and mode detect logic 216. The CSA 202 can measure an input current of the buck-boost converter 100 and can output a CSA signal 201 indicative of the input current. In some embodiments, a slope compensation logic and hardware can act on the CSA signal 201 in order to add an offset signal to the CSA signal 201. Thus, the CSA signal 201 includes a slope compensation offset voltage or charge in some embodiments.

In at least one embodiment, the comparator 206 receives the CSA signal 201 and an EA signal 207 from the EA 208. The EA 208 compares the output voltage (Vout) against a reference voltage (Vref1) to generate an EA signal 207. The comparator 206 compares the CSA signal 201 and the EA signal 207 and provides a control signal 209, referred to as pulse width modulation (PWM) out (or pwm_out) signal, to the BB control logic 210. In one embodiment, the EA control loop as referred to herein refers to at least the EA 208, the CSA 202, and the comparator 206 that adjust the PWM output signal to the BB control logic 210 based on the input voltage (Vin), the output voltage (Vout), and the reference voltage (Vref1), the latter of which is programmable.

In various embodiments, the BB control logic 210 receives the control signal 209 and a mode signal 211 from mode detect logic 216. The mode detect logic 216 can determine a mode and a transition between modes based on the output voltage (Vout) and the input voltage (Vin), and outputs the mode signal 211 accordingly. As discussed, if Vin is higher than Vout, the mode detect logic 216 will output the mode signal 211 indicative of buck mode. In contrast, if Vout is higher than Vin, the mode detect logic 216 will output the mode signal 211 indicative of boost mode.

The BB control logic 210 can use the control signal 209 and the mode signal 211 to control a mode of the buck-boost converter 100. In particular, the BB control logic 210 can send a first control signal 213 (set_buck) to the driver 212 that controls the first high-side switch 104 and the first low-side switch 106 of the buck-boost converter 100. The BB control logic 210 can further send a second control signal 215 (set_boost) to the driver 214 that controls the second high-side switch 110 and the second low-side switch 108 of buck-boost converter 100.

Figure 2B:
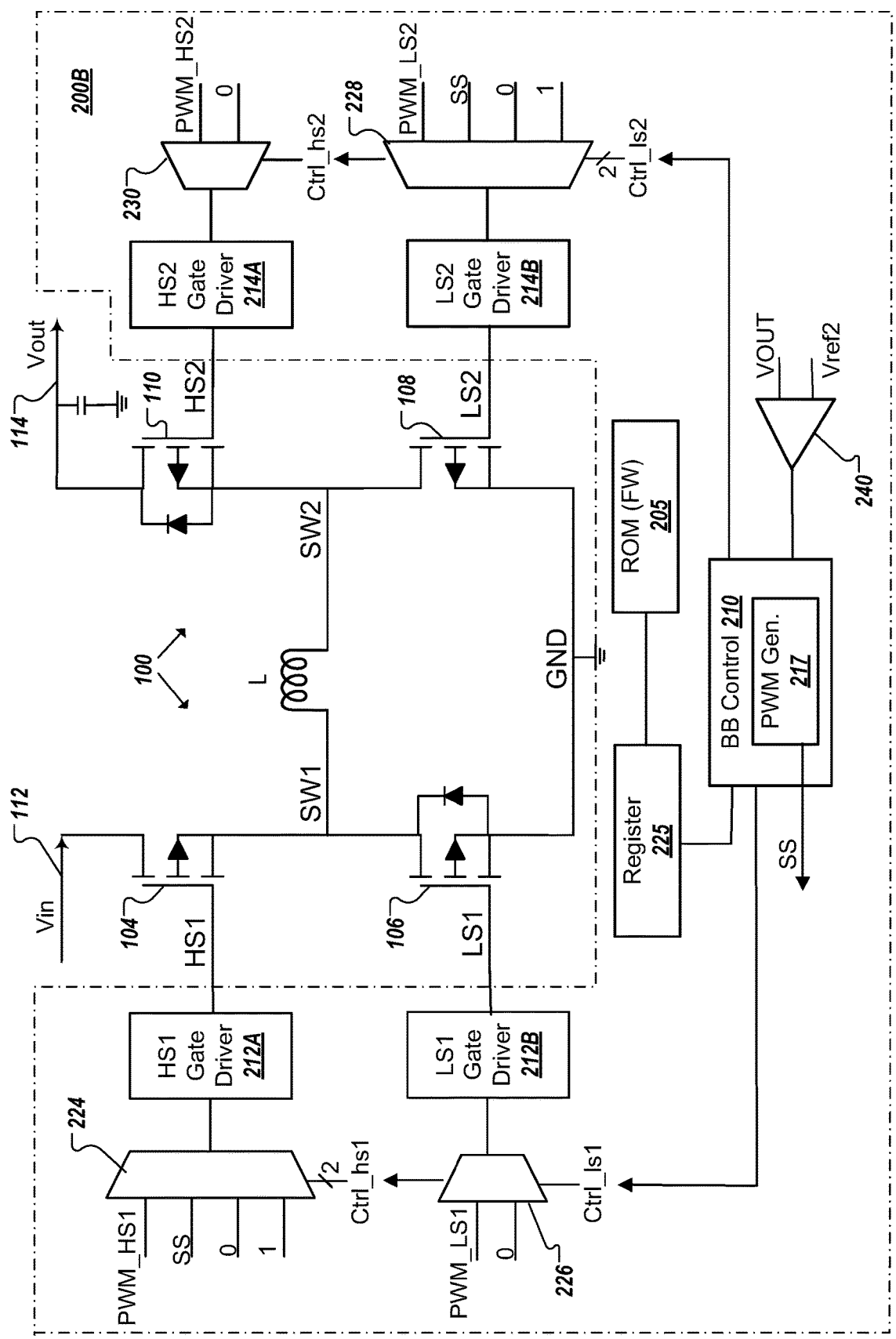
FIG. 2B is a block diagram of a USB controller that includes a buck-boost converter in at least a related embodiment.

FIG. 2B is a block diagram of a USB controller 200B that includes, or is coupled to, the buck-boost converter 100 in at least a related embodiment. This related embodiment illustrates that the gate driver 212 can actually include a first driver 212A (HS1 gate driver) and a third driver 212B (LS1 gate driver) to drive a gate of the first high-side switch 104 and of the first low-side switch 106, respectively. Further, the gate driver 214 can actually include a second driver 214A (HS2 gate driver) and a fourth driver 214B (LS2 gate driver) to drive a gate of the second high-side switch 110 and of the second low-side side switch 108, respectively. As will become apparent, the USB controller 200B of FIG. 2B can be understood as an expansion to the USB controller 200A of the embodiment of FIG. 2A.

In these embodiments, the USB controller 200B can further include a programmable read-only memory (ROM) 205, such as an electrically-erasable programmable read-only memory (EEPROM), a register 225, a first multiplexer 224, a second multiplexer 230, a third multiplexer 226, a fourth multiplexer 228, and a software start (SS) comparator 240 coupled to the BB control logic 210. The SS comparator 240, for example, can have an output provided to the control logic 210 and inputs including the output voltage (Vout) and a reference voltage (Vref2) set at a threshold value at which the USB controller 200B is to transition control of the buck-boost converter 100 to the EA control loop illustrated and discussed in detail with reference to FIG. 2A.

In various embodiments, the BB control logic 210 further includes a pulse-width modulation (PWM) generator 217. As discussed, the register 225 can be a hardware register, a volatile memory location (e.g., of local memory such as cache), or a non-volatile memory location (e.g., in on-chip flash memory), or the like. The ROM 205 can include firmware (FW) that can program the register 225 with particular values (fixed or variable) for the pulse width and frequency at which the BB control logic 210 is to actuate the gate drivers in soft start (SS) mode. By way of example only, the pulse width can range between approximately 20 nanoseconds (ns) to 20 microseconds (μs) and the frequency can range between approximately 10 kilohertz (KHz) and 600 KHz.

In some embodiments, the USB controller 200B can execute the firmware out of the ROM 205 which, in some embodiments, can be adapted to dynamically change or reprogram the register 225 with new values for the pulse width and the frequency. In some instances, this reprogramming can be based on a voltage level of the output voltage, Vout, and in other cases can be based on a design of the BB converter 100, including the input and output capacitances and the inductance of the inductor 102, which are targeted to updated load current, for example. In some embodiments, the USB controller 200B is a programmable system-on-a-chip (PSOC) that is already designed to be programmable using firmware and/or other software.

In some embodiments, the BB control logic 210 uses its PWM generator 217 to generate pulses with a pulse width (PW) and at the frequency of the values retrieved from the register 225, where the output of the PWM generator 217 is indicated as "SS" for soft start. In this way, and by also controlling the multiplexers as will be discussed, the BB control logic 210 can bypass the normal EA control loop during soft start by causing the switches of the BB converter 100 to be driven using the SS pulses generated to have the pulse width and frequency that were previously programmed in the register 225.

In some embodiments, the first multiplexer 224 includes an output to turn on the first driver 212A and is to be controlled by the control logic 210, e.g., via a ctrl_hs1 control signal. The first multiplexer 224 has selectable inputs including: a first input from the error amplifier (EA) loop (PWM_HS1); a second input (SS) from the PWM generator 217 of the BB control logic 210; a zero value ("0"); and a one value ("1"). The second multiplexer 230 has an output to turn on the second driver 214A and is to be controlled by the BB control logic 210A, e.g., via a ctrl_hs2 signal. The second multiplexer 230 has selectable inputs including: a first input from the EA loop (PWM_HS2) and a second input having a zero value ("0").

In some embodiments, the third multiplexer 226 has an output to turn on the third driver 212B and is to be controlled by the BB control logic 210, e.g., via a ctrl_ls1 control signal. The third multiplexer 226 has selectable inputs including: a first input from the EA loop (PWM_LS1) and a second input having a zero value ("0"). The fourth multiplexer 228 has an output to turn on the fourth driver 214B and is to be controlled by the BB control logic 210, e.g., a ctrl_ls2 control signal. The fourth multiplexer 228 has selectable inputs including: a first input from the EA loop (PWM-LS2); a second input (SS) from the PWM generator 217 of the BB control logic 210; a zero value ("0"); and a one value ("1"). The inputs from the EA control loop can be, for example, the control signal 209 with the PWM out (pwm_out).

More specifically, in at least one embodiment, the BB control logic 210 detects the mode from the mode signal 211, and controls the multiplexers differently depending on whether the USB controller 200B starts up in buck mode or in boost mode. In buck mode, the BB control logic 210 can cause the second high-side switch 110 to operate in diode mode, e.g., by selecting the zero ("0") input value of the second multiplexer 230. Also the BB control logic 210 can cause the first low-side switch 106 to operate in diode mode, e.g., by selecting the zero ("0") input value of the third multiplexer 226. The BB control logic 210 can further retrieve values of the pulse width and the frequency from the register 225 and cause the first high-side switch 104 to turn on using pulses having the pulse width and at the frequency, e.g., by selecting the SS input of the first multiplexer 224. The BB control logic 210 can further detect an output voltage (Vout) at the output terminal of the buck-boost converter that exceeds a threshold value, and, in response to the detection, transfer control of the buck-boost converter to the error amplifier control loop coupled to the control logic 210, as illustrated and discussed with reference to FIG. 2A in detail. The threshold value can come from the reference voltage (Vref2), which can be programmed by the firmware out of the ROM 205 as well.

Further, in boost mode, the control logic 210 can cause the second high-side switch 110 and the first low-side switch 106 to operate in diode mode, e.g., by selecting the zero ("0") input value of each of the second multiplexer 230 and the third multiplexer 226. The BB control logic 210 can further retrieve values of the pulse width and the frequency from the register 225 and cause the first high-side switch 104 and the second low-side switch 108 to turn on using pulses having the pulse width and at the frequency, e.g., by selecting the SS input of the first multiplexer 224 and of the fourth multiplexer 228. Alternatively, in boost mode, the control logic 210 can cause the second high-side switch 110 and the first low-side switch 106 to operate in diode mode, e.g., by selecting the zero ("0") input value of each of the second multiplexer 230 and the third multiplexer 226. The BB control logic 210 can cause the first high-side switch 104 to be always ON e.g., by selecting the one ("1") input of the first multiplexer 224. The BB control logic 210 can further retrieve values of the pulse width and the frequency from the register 225 and cause the second low-side switch 108 to turn on using pulses having the pulse width and at the frequency, e.g., by selecting the SS input of the fourth multiplexer 228. The BB control logic 210 can further detect an output voltage (Vout) at the output terminal of the buck-boost converter 100 that exceeds a threshold value (e.g., of Vref2), and, in response to the detection, transfer control of the buck-boost converter to the error amplifier control loop coupled to the control logic 210, as illustrated and discussed with reference to FIG. 2A in detail.

In some embodiments, the value of Vref2 is programmed (or set) to be slightly higher (e.g., between one and five percent higher) than that a target output voltage of the buck-boost converter 100. In this way, the USB controller 200B can avoid rapid (or wide) opening of the first high-side switch 104 and the second low-side switch 108 when the EA control loop takes over. For example, if the target Vout is five volts (5 V), then the firmware can set the Vref2 value to be 5.1 V. This allows the pulse width to be narrower when the buck-boost converter 100 transitions to EA mode and enables a smooth transition into EA control of the buck-boost converter 100. In this way, the output voltage under control of the EA control loop can immediately stabilize without voltage peaks.

Figure 3:
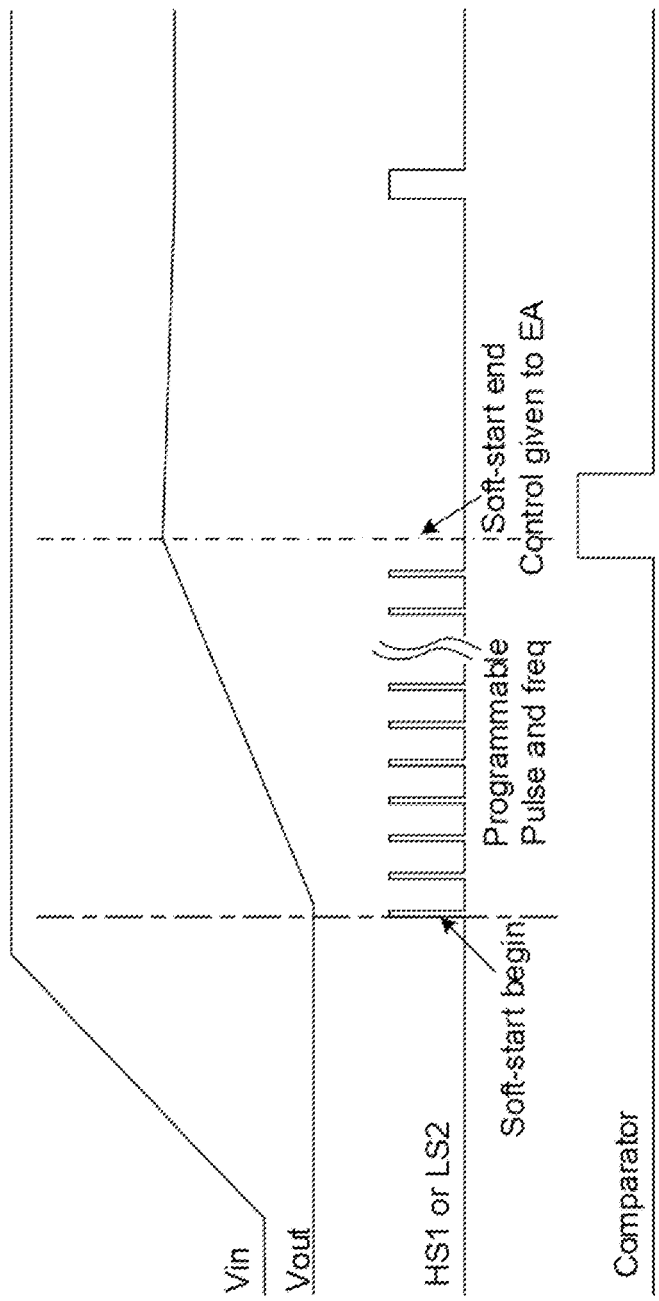
FIG. 3 is a timing diagram of control signals to switches of the buck-boost converter of FIGS. 2A-2B and corresponding voltage input and voltage output of the USB controller in at least one embodiment of the buck mode.

FIG. 3 is a timing diagram of control signals to switches of the buck-boost converter 100 of FIGS. 2A-2B and corresponding voltage input (Vin) and voltage output (Vout) of the USB controller 200B in at least one embodiment of the buck mode. As the input voltage ramps, it does so slowly and the beginning of the soft start period, the BB control logic 210 sends pulses at the pulse width and frequency retrieved from the register 225 to the first high-side switch 104 for buck mode. In Boost mode, as the input voltage ramps, it does so slowly and the beginning of the soft start period, the BB control logic 210 sends pulses at the pulse width and frequency retrieved from the register 225 to the first high-side switch 104 and the second low-side switch 108. During the soft start period, the output voltage (Vout) at the output terminal 114 slowly ramps up to the target voltage, which corresponds with the reference voltage (Vref2). When the comparator 240 is tripped because Vout has reached the threshold value associated with Vref2, the BB control logic 210 can transfer control to the EA control loop.

Figure 4:
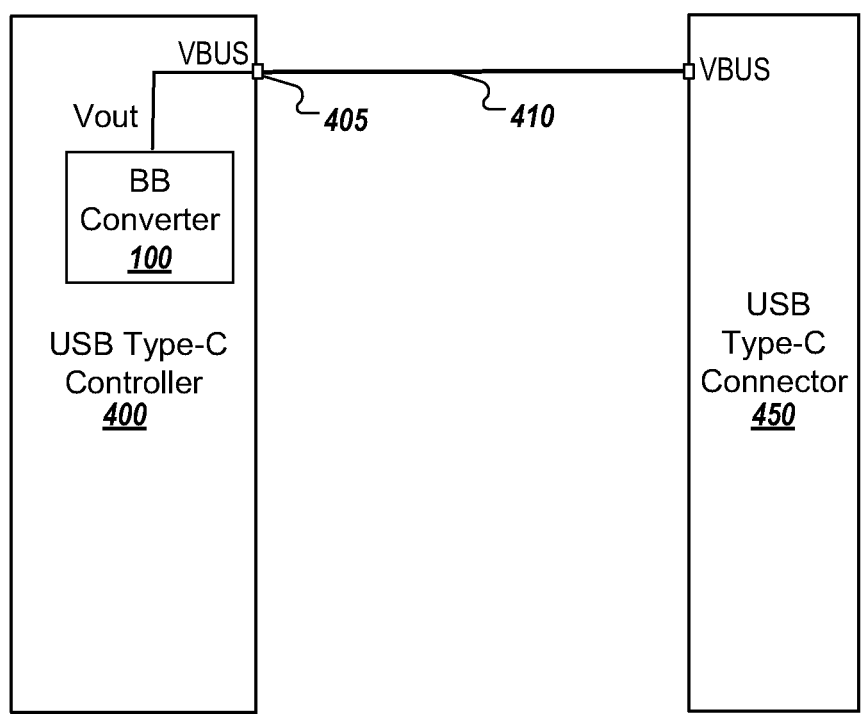
FIG. 4 is a block diagram of a USB Type-C controller that includes the buck-boost converter of FIGS. 2A-2B in at least one embodiment.

FIG. 4 is a block diagram of a USB Type-C controller 400 that includes the buck-boost converter 100 of FIGS. 2A-2B in at least one embodiment. The USB Type-C controller 400 can further include a VBUS terminal 405, which is coupled to a VBUS line 410 and the buck-boost converter 100. The VBUS line 410 can further be coupled to a USB Type-C connector 450 that connected to a USB cable for example. In one embodiment, the VBUS line 410 is a part of the USB Type-C connector 450. In some embodiments, the USB Type-C controller 400 is the USB controller 200B of FIG. 2B, which expands on the USB controller 200A of FIG. 2A.

Figure 5:
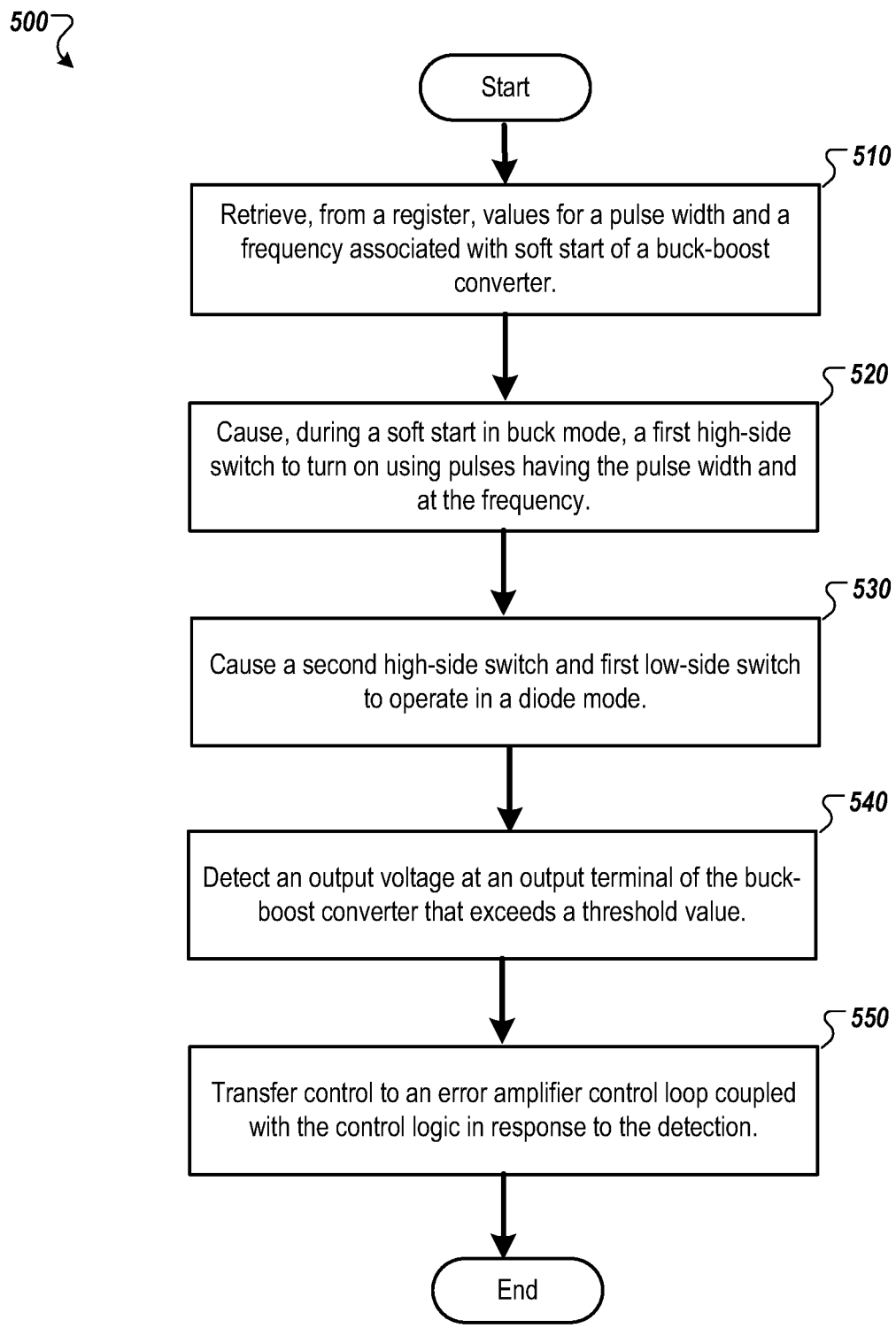
FIG. 5 is a flow diagram of a method of performing a soft start of a buck-boost converter in buck mode in at least one embodiment.

FIG. 5 is a flow diagram of a method 500 of performing a soft start of a buck-boost converter in buck mode in at least one embodiment. The method 500 can be performed by processing logic comprising hardware, firmware, or any combination thereof. The method 500 can be performed by the USB controller 200B of FIG. 2B. In another embodiment, method 500 can be performed by the BB control logic 210. In another embodiment, method 500 can be performed by USB Type-C controller 400 of FIG. 4.

At operation 510, the processing logic retrieves values of the pulse width and the frequency from the register 225. The processing logic (or firmware executed by the USB controller 200B) can program these values of the pulse width and the frequency into the register 225.

At operation 520, the processing logic causes, in the buck mode, the first high-side switch 104 to turn on using pulses having the pulse width and at the frequency. The PWM generator 217 can generate these SS pulses for the BB control logic 210, which are then provided to the first multiplexer 224. The mode detect logic 216 of FIG. 2A can be employed to detect that the buck-boost converter 100 is in buck mode.

At operation 530, the processing logic causes the second high-side switch 110 and the first low-side switch 106 of the buck-boost converter 100 to operate in diode mode, e.g., to be turned off by selecting a zero ("0") value of the second multiplexer 230 and the third multiplexer 226, respectively.

At operation 540, the processing logic detects an output voltage at the output terminal 114 of the buck-boost converter 100 that exceeds a threshold value, e.g., of the reference voltage, Vref2 in FIG. 2B. At operation 550, the processing logic, in response to the detection, transfers control of the buck-boost converter 100 to an error amplifier (EA) control loop coupled to the control logic 210. In one embodiment, the EA control loop as referred to herein refers to at least the EA 208, the CSA 202, and the comparator 206 that adjust the PWM output signal to the BB control 210 based on the input voltage (Vin), the output voltage (Vout), and the reference voltage (Vref1), the latter of which is programmable.

Figure 6:
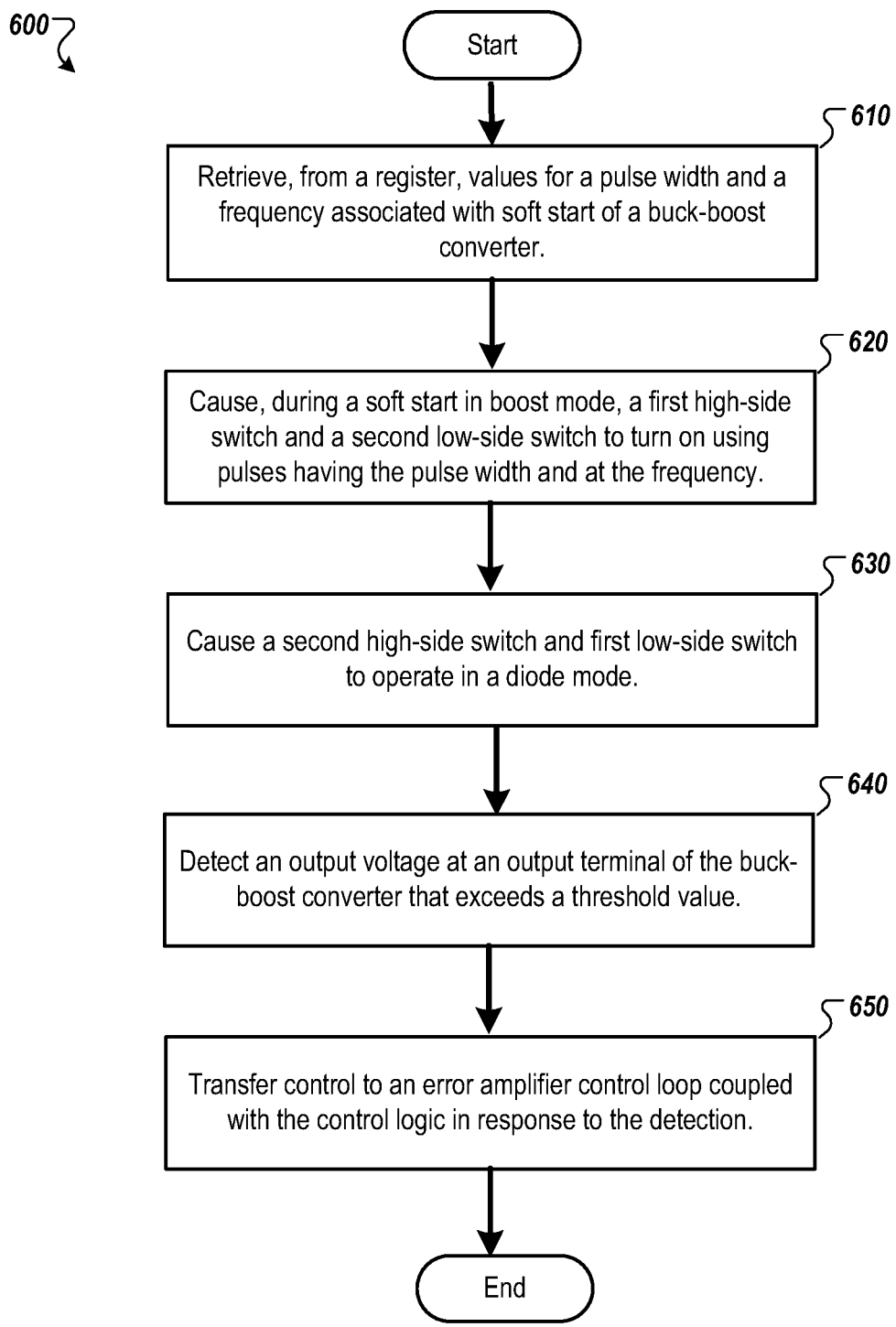
FIG. 6 is a flow diagram of a method of performing a soft start of a buck-boost converter in boost mode in at least one embodiment.

FIG. 6 is a flow diagram of a method 600 of performing a soft start of a buck-boost converter in boost mode in at least one embodiment. The method 600 can be performed by processing logic comprising hardware, firmware, or any combination thereof. The method 600 can be performed by the USB controller 200B of FIG. 2B. In another embodiment, method 600 can be performed by the BB control logic 210. In another embodiment, method 600 can be performed by USB Type-C controller 400 of FIG. 4.

At operation 610, the processing logic retrieves values of the pulse width and the frequency from the register 225. The processing logic (or firmware executed by the USB controller 200B) can program these values of the pulse width and the frequency into the register 225.

At operation 620, the processing logic causes, in the boost mode, the first high-side switch 104 and the second low-side switch 108 to turn on using pulses having the pulse width and at the frequency. The PWM generator 217 can generate these SS pulses for the BB control logic 210, which are then provided to the first multiplexer 224 and the fourth multiplexer 228, respectively. The mode detect logic 216 of FIG. 2A can be employed to detect that the buck-boost converter 100 is in buck mode.

At operation 630, the processing logic causes the second high-side switch 110 and the first low-side switch 106 of the buck-boost converter 100 to operate in diode mode, e.g., to be turned off by selecting a zero ("0") value of the second multiplexer 230 and the third multiplexer 226, respectively.

At operation 640, the processing logic detects an output voltage at the output terminal 114 of the buck-boost converter 100 that exceeds a threshold value, e.g., of the reference voltage, Vref2 in FIG. 2B. At operation 650, the processing logic, in response to the detection, transfers control of the buck-boost converter 100 to an error amplifier (EA) control loop coupled to the control logic 210. In one embodiment, the EA control loop as referred to herein refers to at least the EA 208, the CSA 202, and the comparator 206 that adjust the PWM output signal to the BB control 210 based on the input voltage (Vin), the output voltage (Vout), and the reference voltage (Vref1), the latter of which is programmable.

Various embodiments of the USB-C soft-start architecture described herein may include various operations. These operations may be performed and/or controlled by hardware components, digital hardware and/or firmware, and/or combinations thereof. As used herein, the term "coupled to" may mean connected directly to or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An integrated circuit (IC) controller for a Universal Serial Bus (USB) Type-C device, the IC controller comprising:
   a register that is programmable to store a pulse width and a frequency;
   a first high-side switch coupled between an input terminal and a first side of an inductor of a buck-boost converter;
   a second high-side switch coupled between a second side of the inductor and an output terminal of the buck-boost converter; and
   control logic operatively coupled to the register and gates of the first high-side switch and the second high-side switch, wherein, to perform a soft start in one of a buck mode or boost mode, the control logic is to:
   cause the second high-side switch to operate in a diode mode;
   retrieve values of the pulse width and the frequency from the register;
   cause the first high-side switch to turn on using pulses having the pulse width and at the frequency;
   detect an output voltage at the output terminal of the buck-boost converter that exceeds a threshold value; and
   in response to the detection, transfer control of the buck-boost converter to an error amplifier control loop coupled to the control logic.

2. The IC controller of claim 1, further comprising:
   a first driver to drive the gate of the first high-side switch; and
   a first multiplexer having an output to turn on the first driver and to be controlled by the control logic, the first multiplexer having selectable inputs comprising a first input from the error amplifier control loop and a second input from a pulse-width modulation (PWM) generator of the control logic.

3. The IC controller of claim 1, further comprising:
a second driver to drive the gate of the second high-side switch; and
a second multiplexer having an output to turn on the second driver and to be controlled by the control logic, the second multiplexer having selectable inputs comprising a first input from the error amplifier control loop and a second input having a zero value.

4. The IC controller of claim 1, further comprising:
a first low-side switch coupled between the first side of the inductor and a ground of the buck-boost converter;
a second low-side switch coupled between the second side of the inductor and the ground; and
wherein, to perform the soft start in boost mode, the control logic is further to:
cause the first low-side switch to operate in the diode mode; and
also cause the second low-side switch to turn on using pulses having the pulse width at the frequency; and
wherein, to perform the soft start in buck mode, the control logic is further to cause the first low-side switch to operate in the diode mode.

5. The IC controller of claim 4, further comprising:
a third driver to drive the gate of the first low-side switch; and
a third multiplexer having an output to turn on the third driver and to be controlled by the control logic, the third multiplexer having selectable inputs comprising a first input from the error amplifier control loop and a second input having a zero value.

6. The IC controller of claim 4, further comprising:
a fourth driver to drive the gate of the second low-side switch; and
a fourth multiplexer having an output to turn on the fourth driver and to be controlled by the control logic, the fourth multiplexer having selectable inputs comprising a first input from the error amplifier control loop and a second input from a pulse-width modulation (PWM) generator of the control logic.

7. The IC controller of claim 1, further comprising a comparator having an output provided to the control logic and inputs comprising the output voltage and a reference voltage set at the threshold value, wherein the reference voltage is set to between approximately one and five percent higher than a target output voltage of the buck-boost converter.

8. A method comprising:
retrieving, by control logic of a USB controller, from a register, values for a pulse width and a frequency associated with soft start of a buck-boost converter;
causing, by the control logic during a soft start in a buck mode, a first high-side switch of the buck-boost converter to turn on using pulses having the pulse width and at the frequency;
causing, by the control logic, a second high-side switch to operate in a diode mode;
causing, by the control logic, a first low-side switch to operate in the diode mode;
detecting, by the control logic, an output voltage at an output terminal of the buck-boost converter that exceeds a threshold value; and
transferring control, by the control logic, to an error amplifier control loop coupled to the control logic in response to the detecting.

9. The method of claim 8, further comprising dynamically changing, using firmware executed by the USB controller, the values in the register for the pulse width and the frequency based on a voltage level of the output voltage.

10. The method of claim 8, wherein:
causing the first high-side switch to turn on comprises sending the pulses to an input of a first multiplexer, which is coupled to a gate of the first high-side switch, and controlling the first multiplexer to select the input;
causing the second high-side switch to operate in the diode mode comprises controlling a second multiplexer, which is coupled to a gate of the second high-side switch, to select a zero value to turn the second high-side switch off; and
causing the first low-side switch to operate in the diode mode comprises controlling a third multiplexer, which is coupled to a gate of the first low-side switch, to select a zero value to turn the first low-side switch off.

11. The method of claim 8, further comprising:
causing, by the control logic during a soft start in a boost mode, the second high-side switch of the buck-boost converter to operate in the diode mode;
causing, by the control logic, the first low-side switch of the buck-boost converter to operate in the diode mode;
causing, by the control logic, the first high-side switch of the buck-boost converter to turn on using pulses having the pulse width and at the frequency; and
causing, by the control logic, a second low-side switch of the buck-boost converter to turn on using pulses having the pulse width and at the frequency.

12. The method of claim 11, wherein:
causing the first low-side switch to operate in the diode mode comprises controlling a third multiplexer, which is coupled to a gate of the first low-side switch, to select a zero value to turn the first low-side switch off; and
causing the second low-side switch to turn on comprises sending the pulses to an input of a fourth multiplexer, which is coupled to a gate of the second low-side switch, and controlling the fourth multiplexer to select the input.

13. The method of claim 8, wherein detecting the output voltage that exceeds the threshold value comprises receiving an output of a comparator that compares the output voltage against a reference voltage set at the threshold value, the method further comprising setting the reference voltage to between approximately one and five percent higher than a target output voltage of the buck-boost converter.

14. A Universal Serial Bus (USB) device comprising:
a buck-boost converter comprising:
an input terminal and an output terminal;
a first high-side switch coupled between the input terminal and a first side of an inductor; and
a second high-side switch coupled between a second side of the inductor and the output terminal;
a USB Type-C connector comprising a VBUS line; and
an integrated circuit (IC) controller comprising:
a VBUS terminal coupled to the VBUS line of the USB Type-C connector and to the output terminal of the buck-boost converter;
a register that is programmable to store a pulse width and a frequency; and
control logic operatively coupled to the register and the buck-boost converter, wherein, to perform a soft start in one of a buck mode or boost mode, the control logic is to:
cause the second high-side switch to operate in a diode mode;
retrieve values of the pulse width and the frequency from the register;

cause the first high-side switch to turn on using pulses having the pulse width and at the frequency;

detect an output voltage at the output terminal of the buck-boost converter that exceeds a threshold value; and in response to the detection, transfer control of the buck-boost converter to an error amplifier control loop coupled to the control logic.

15. The USB device of claim 14, wherein the buck-boost converter further comprises:

a first driver to drive a gate of the first high-side switch; and a first multiplexer having an output to turn on the first driver and to be controlled by the control logic, the first multiplexer having selectable inputs comprising a first input from the error amplifier loop and a second input from a pulse-width modulation (PWM) generator of the control logic.

16. The USB device of claim 14, wherein the buck-boost converter further comprises:

a second driver to drive a gate of the second high-side switch; and a second multiplexer having an output to turn on the second driver and to be controlled by the control logic, the second multiplexer having selectable inputs comprising a first input from the error amplifier loop and a second input having a zero value.

17. The USB device of claim 14, wherein the buck-boost converter further comprises:

a first low-side switch coupled between the first side of the inductor and a ground of the buck-boost converter;

a second low-side switch coupled between the second side of the inductor and the ground; and wherein, to perform the soft start in boost mode, the control logic is further to:

cause the first low-side switch to operate in the diode mode; and also cause the second low-side switch to turn on using pulses having the pulse width at the frequency; and wherein, to perform the soft start in buck mode, the control logic is further to cause the second low-side switch to operate in the diode mode.

18. The USB device of claim 17, wherein the buck-boost converter further comprises:

a third driver to drive a gate of the first low-side switch; and a third multiplexer having an output to turn on the third driver and to be controlled by the control logic, the third multiplexer having selectable inputs comprising a first input from the error amplifier and a second input having a zero value.

19. The USB device of claim 17, wherein the buck-boost converter further comprises:

a fourth driver to drive a gate of the second low-side switch; and a fourth multiplexer having an output to turn on the fourth driver and to be controlled by the control logic, the fourth multiplexer having selectable inputs comprising a first input from the error amplifier control loop and a second input from a pulse-width modulation (PWM) generator of the control logic.

20. The USB device of claim 14, further comprising a comparator having an output provided to the control logic and inputs comprising the output voltage and a reference voltage set at the threshold value, wherein the reference voltage is set to between approximately one and five percent higher than a target output voltage of the buck-boost converter.

* * * * *